(12) United States Patent
Shen et al.

(10) Patent No.: US 10,411,824 B2
(45) Date of Patent: Sep. 10, 2019

(54) METHOD FOR QUASI-COARSE WAVELENGTH DIVISION MULTIPLEXING OPTICAL NETWORK

(71) Applicant: SOOCHOW UNIVERSITY, Suzhou (CN)

(72) Inventors: Gangxiang Shen, Suzhou (CN); Yongcheng Li, Suzhou (CN); Mingyi Gao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 15 days.

(21) Appl. No.: 15/521,979

(22) PCT Filed: Oct. 27, 2015

(86) PCT No.: PCT/CN2015/092918
§ 371 (c)(1),
(2) Date: Apr. 26, 2017

(87) PCT Pub. No.: WO2017/000445
PCT Pub. Date: Jan. 5, 2017

(65) Prior Publication Data
US 2017/0331580 A1      Nov. 16, 2017

(30) Foreign Application Priority Data

Jun. 30, 2015   (CN) .......................... 2015 1 0375212

(51) Int. Cl.
*H04Q 11/00*        (2006.01)
*H04B 1/00*         (2006.01)
(Continued)

(52) U.S. Cl.
CPC ........ *H04J 14/0227* (2013.01); *H04B 10/516* (2013.01); *H04J 14/026* (2013.01); *H04J 14/0278* (2013.01)

(58) Field of Classification Search
CPC .................... H04J 14/0227; H04J 14/0278
See application file for complete search history.

(56) References Cited

U.S. PATENT DOCUMENTS

| | | | | |
|---|---|---|---|---|
| 2010/0287073 | A1* | 11/2010 | Kocis ................... | G06Q 10/047 705/28 |
| 2012/0316914 | A1* | 12/2012 | Lee ........................ | G06Q 10/06 705/7.24 |

(Continued)

FOREIGN PATENT DOCUMENTS

| | | |
|---|---|---|
| CN | 101127541 A | 2/2008 |
| CN | 103812790 A * | 5/2014 |

(Continued)

OTHER PUBLICATIONS

Castillo et al. (Castillo, E., Conejo A.J., Pedregal, P., Garc³ a, R. and Alguacil, N. (2002), Building and Solving Mathematical Programming Models in Engineering and Science, Pure and Applied Mathematics Series, Wiley, New York. Copyright 2002 by John Wiley and Sons, Inc.*

*Primary Examiner* — Mina M Shalaby
(74) *Attorney, Agent, or Firm* — SZDC Law P.C.

(57) ABSTRACT

A design method for a quasi-coarse wavelength division multiplexing optical network is provided. A spectral grid of an optical channel has a pre-set fixed bandwidth, and the pre-set fixed bandwidth is at least 200 GHz. A modulation format of the optical channel is adaptively selected according to actual rate requirements and physical channel conditions, thus selecting an optimal modulation format achieve a tradeoff between the total cost of IP router ports and regenerators and the served number of traffic demand. The above technical solution effectively resolves the technical problems in the prior art of high construction costs and low spectral efficiency of elastic optical networks.

5 Claims, 4 Drawing Sheets

(51) Int. Cl.
*H04B 10/27* (2013.01)
*H04B 10/50* (2013.01)
*H04B 10/516* (2013.01)
*H04J 14/02* (2006.01)

(56) References Cited

U.S. PATENT DOCUMENTS

| | | | | |
|---|---|---|---|---|
| 2014/0363164 A1* | 12/2014 | Kim | ........................ | H04J 14/06 398/65 |
| 2016/0164626 A1* | 6/2016 | Cavaliere | .............. | H04L 1/0006 398/183 |
| 2016/0191193 A1* | 6/2016 | Mitchell | ............. | H04J 14/0221 398/27 |
| 2016/0192042 A1* | 6/2016 | Mitchell | ............ | H04Q 11/0005 398/48 |
| 2016/0197679 A1* | 7/2016 | Tanaka | ................. | H04B 10/572 398/79 |

FOREIGN PATENT DOCUMENTS

| | | |
|---|---|---|
| CN | 103888223 A | 6/2014 |
| CN | 104901764 A | 9/2015 |

\* cited by examiner

METHOD FOR QUASI-COARSE WAVELENGTH DIVISION MULTIPLEXING OPTICAL NETWORK

The present application is the national phase of International Application No. PCT/CN2015/092918, titled "DESIGN METHOD FOR QUASI-COARSE WAVELENGTH DIVISION MULTIPLEXING OPTICAL NETWORK," filed on Oct. 27, 2015, which claims the benefit of Chinese Patent Application No. 201510375212.2, titled "DESIGN METHOD FOR QUASI-COARSE WAVELENGTH DIVISION MULTIPLEXING OPTICAL NETWORK," filed on Jun. 30, 2015 with the State Intellectual Property Office of the People's Republic of China, both of which are incorporated herein by reference in their entireties.

TECHNICAL FIELD

The present disclosure relates to the technical field of network architectures of an optical network, and in particular to a design method for a quasi-coarse wavelength division multiplexing optical network.

BACKGROUND

The optical transmission systems have evolved from past coarse wavelength division multiplexing (CWDM) to today's dense wavelength division multiplexing (DWDM). Recently, a more flexible and effective network architecture, called elastic optical network (EON), was proposed to provide higher transmission capacity and better meet ever-increasing traffic demand. Further, EON provides high spectrum efficiency by reducing the granularity of frequency spacing and improves flexibility in spectrum allocation for optical channels.

However, the compatibility between the current DWDM optical network and the EON is still a challenging issue. To enable today's DWDM optical network to evolve to EON, it is required to upgrade DWDM network hardware, such as reconfigurable optical add/drop multiplexer (ROADM), and to adopt expensive wavelength selective switches for flexible grid, resulting in increased EON construction costs. Meanwhile, in a case that an optical channel service requires a low optical bandwidth, a large amount of guard band overhead is apt to be generated, resulting in reduced spectrum efficiency.

SUMMARY

In view of this, it is provided in the present disclosure a design method for a quasi-coarse wavelength division multiplexing (Quasi-CWDM) optical network, for addressing the technical issues with the elastic optical network (EON), such as increased construction costs and reduced spectrum efficiency under some situations.

In order to address the above technical issues, it is provided in the present disclosure a design method for a quasi-coarse wavelength division multiplexing optical network. The design method includes selecting an optimal modulation format for an optical channel adaptively based on an actual rate requirement and a channel physical condition to balance construction costs against spectrum efficiency. A spectrum spacing of the optical channel has a preset fixed bandwidth greater than or equal to 200 GHz.

Alternatively, in the above method, selecting the optimal modulation format for the optical channel adaptively based on the actual rate requirement and the channel physical condition may include selecting the modulation format for the optical channel by using an MILP model. The actual rate requirement and the channel physical condition are taken as inputs of the MILP model, and the optimal modulation format is outputted by the MILP model by taking maximizing a total served traffic demand as a first objective and minimizing the construction costs as a second objective.

Alternatively, in the above method, the optical channel may be an optical super-channel.

Alternatively, in the above method, the preset fixed bandwidth may be 200 GHz.

Alternatively, in the above method, the quasi-coarse wavelength division multiplexing optical network may include at least two optical channels and a frequency spacing between adjacent ones of the at least two optical channels is 25 Hz.

Alternatively, in the above method, the modulation format for the optical channel may include BPSK, QPSK or 8QAM.

With the design method for the Quasi-CWDM optical network according to the present disclosure, the spectrum spacing of the optical channel has a preset fixed bandwidth which is greater than or equal to 200 GHz (a coarser filtering frequency spacing can be realized by an array waveguide grating for the Quasi-CWDM technique, so that the bandwidth of the spectrum spacing in the present disclosure is greater than that in the DWDM optical network, thereby effectively improving the spectrum efficiency of the optical network). The optimal modulation format for the optical channel is selected adaptively based on the actual rate requirement and the channel physical condition, to balance construction costs against spectrum efficiency. The Quasi-CWDM optical network has a key advantage as compared with the EON: the ROADM node of Quasi-CWDM optical network is very simple, which is similar to the DWDM network, and the ROADM node does not need any expensive wavelength selective switch (WSS) for flexible grid, thereby effectively reducing the construction costs of the Quasi-CWDM optical network.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

The technical solutions in embodiments of the present disclosure are clearly and completely described hereinafter in conjunction with the drawings in the embodiments of the present disclosure. Apparently, the described embodiments are only a few rather than all of the embodiments of the disclosure. All other embodiments obtained by those skilled in the art based on the embodiments of the present disclosure without any creative efforts fall within the protection scope of the present disclosure.

An object of the present disclosure is to provide a design method for a quasi-coarse wavelength division multiplexing (Quasi-CWDM) optical network to address the technical issues with the elastic optical network (EON) in the conventional art, such as increased costs and reduced spectrum efficiency.

The disclosure will be described in detail in conjunction with the drawings and specific implementation, in order to make those skilled in the art have a better understanding.

Figure 1:
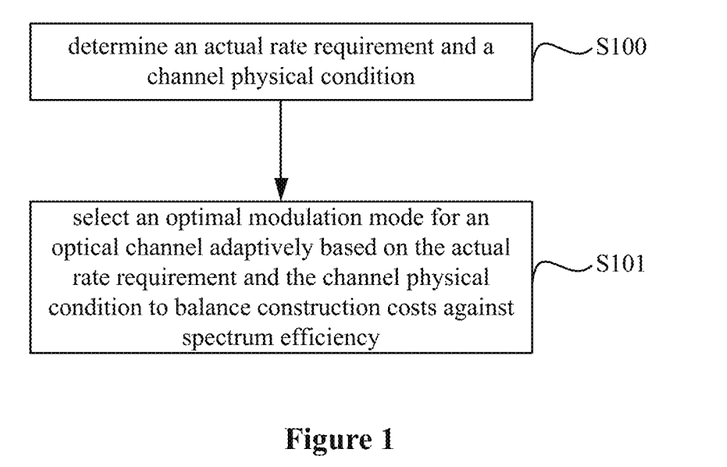
FIG. 1 is a flowchart of a design method for a quasi-coarse wavelength division multiplexing optical network according to an embodiment of the present disclosure.

FIG. 1 is a flowchart of a design method for a quasi-coarse wavelength division multiplexing optical network according to an embodiment of the present disclosure. The method may specifically include steps S100 and S101.

In step S100, an actual rate requirement and a channel physical condition are determined.

The actual rate requirement refers to the amount of data that can be transmitted by the capacity of the optical channel per second, and the channel physical condition in the present disclosure refers to the physical distance of the optical channel.

In step S101, based on the actual rate requirement and the channel physical condition, an optimal modulation format for the optical channel is adaptively selected to balance construction costs against spectrum efficiency. A spectrum spacing of the optical channel has a preset fixed bandwidth greater than or equal to 200 GHz.

In the present disclosure, the modulation format for the optical channel may be BPSK, QPSK or 8QAM and may be other modulation formats, which is not limited thereto herein. In practice, which modulation format is to be selected among the above-described modulation formats is determined by an execution content of step S101.

In the present disclosure, the preset fixed bandwidth may be 200 GHz. If the Quasi-CWDM optical network includes at least two optical channels, the frequency spacing between any two adjacent optical channels may be 25 Hz. The preset fixed bandwidth and the value of the frequency spacing between adjacent optical channels are given as only examples, and are not strictly defined herein. The specific values may be set by those skilled in the art according to actual requirements.

In the technical solution according to the embodiment of the present disclosure, the optical channel may be an optical super-channel, which also caters to the fact that the optical super-channel will lead the development trend of the future optical transmission network.

In step S101, a mixed integer linear optimization model is proposed to maximize the total served IP traffic demand. That is, an MILP (Mixed Integer Linear Programming) model is adopted for selecting the modulation format for the optical channel. Specifically, the actual rate requirements and the channel physical conditions are taken as inputs of the MILP model; and the optimal modulation format is output by the MILP model by taking maximizing a total served traffic demand as a first objective and minimizing the construction costs as a second objective.

It is provided in the present disclosure a new optical transmission network architecture which has improved spectrum efficiency and reduced costs, i.e., a method for design a Quasi-CWDM optical network which is a next generation of optical transmission network based on Quasi-CWDM transmission technology.

In a first aspect, the spectrum efficiency is improved. All established channels are optical channels with preset fixed bandwidths and this preset fixed bandwidth is at least 200 GHz (larger than a bandwidth of a spectrum spacing in a DWDM optical network). It should be noted that though Quasi-CWDM technology is similar to the mixed line rate technique in the DWDM network, Quasi-CWDM optical networks have much coarser frequency spacing than that of the DWDM network, because the filtering frequency spacing of an array waveguide grating is much coarser under Quasi-CWDM technique, such as 200 GHz or 400 GHz. This can greatly enhance spectrum efficiency for the optical network and is very effective for future super-channel control optical networks.

Figure 2:
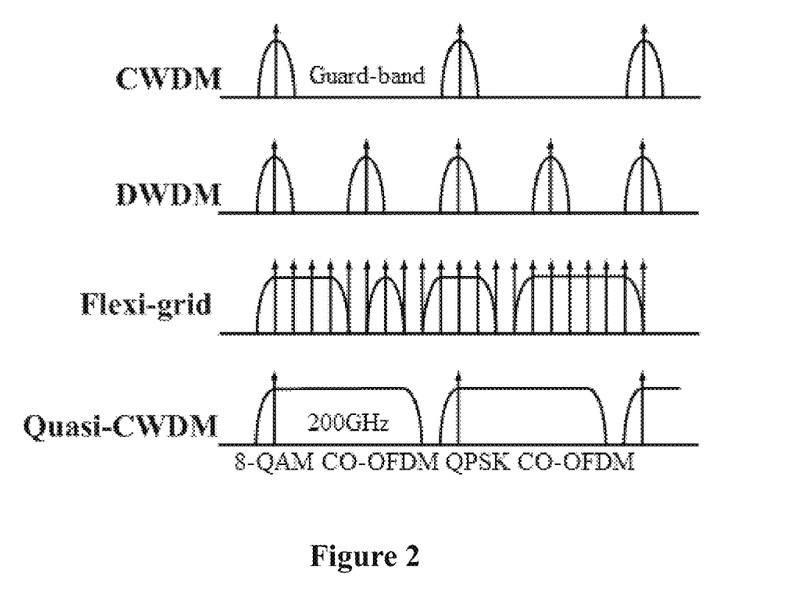
FIG. 2 is a comparison diagram showing an optical channel spectrum for different optical networks in a design method for a quasi-coarse wavelength division multiplexing optical network according to an embodiment of the present disclosure.

FIG. 2 is a comparison diagram showing an optical channel spectrum of the design method for the quasi-coarse wavelength division multiplexing optical network according to the present disclosure and for optical networks using other techniques (such as CWDM, DWDM and Flexi-grid). It is obvious that frequency spacing of the Quasi-CWDM optical network is coarser than that of the optical network using other techniques.

In a second aspect, the cost is lowered. The optimal modulation format for the optical channel is adaptively selected based on the actual rate requirement and the channel physical condition to balance construction costs against spectrum efficiency. For IP over Quasi-CWDM optical networks and a certain lightpath distance of optical channels, different modulation formats require different numbers of IP routers and regenerators. The specific circumstances may refer to Table 1 and Table 2, where the cost of a BPSK regenerator is normalized to one-unit and the cost of a router port is assumed to be double of that of any regenerator for a same modulation format.

TABLE 1

Transparent reaches and costs for different modulation formats

| Modulation format | Spectrum efficiency | Cost of regenerator | Cost of IP router | Transparent reach (km) |
|---|---|---|---|---|
| BPSK | 1 | 1 | 2 | 4000 |
| QPSK | 2 | 1.3 | 2.6 | 2000 |
| 8-QAM | 3 | 1.5 | 3 | 1000 |

TABLE 2

Required number of IP router ports, regenerators, and total costs for different modulation formats

| Modulation format | Number of regenerators | Number of IP router ports | Number of channels (bidirectional) | Total cost |
|---|---|---|---|---|
| BPSK | 0 | 10 | 5 | 20 |
| QPSK | 0 | 6 | 3 | 15.6 |
| 8-QAM | 4 | 4 | 2 | 18 |

Figure 3:
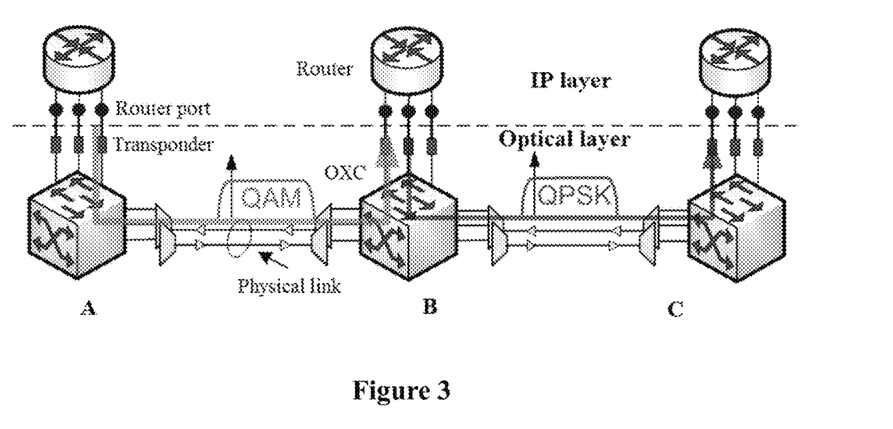
FIG. 3 is an IP over Quasi-CWDM network architecture in a design method for a quasi-coarse wavelength division multiplexing optical network according to an embodiment of the present disclosure.

FIG. 3 is an IP over Quasi-CWDM network architecture in a design method for a quasi-coarse wavelength division multiplexing optical network according to the present disclosure, which includes an IP layer and a Quasi-CWDM optical layer. Each node includes a pair of core router and Quasi-CWDM ROADM node devices. The IP layer consists of IP router nodes and virtual links. The optical layer consists of ROADM nodes and fiber links. To establish a lightpath, two IP router ports in the IP layer and zero or multiple signal regenerators in the optical layer are provided. The Quasi-CWDM network provisions super-channels whose spectrum spacing is at least 200 GHz. The modulation format for each optical super-channel may be adaptively selected. Table 1 shows the relationship between the transparent reach and the used modulation format for each super-channel, and table 2 shows the relative costs of regenerators and router ports in different modulation formats.

For a certain lightpath distance of optical channels, different numbers of IP routers and regenerators are required for different modulation formats. An example is given as follows.

Figure 4:
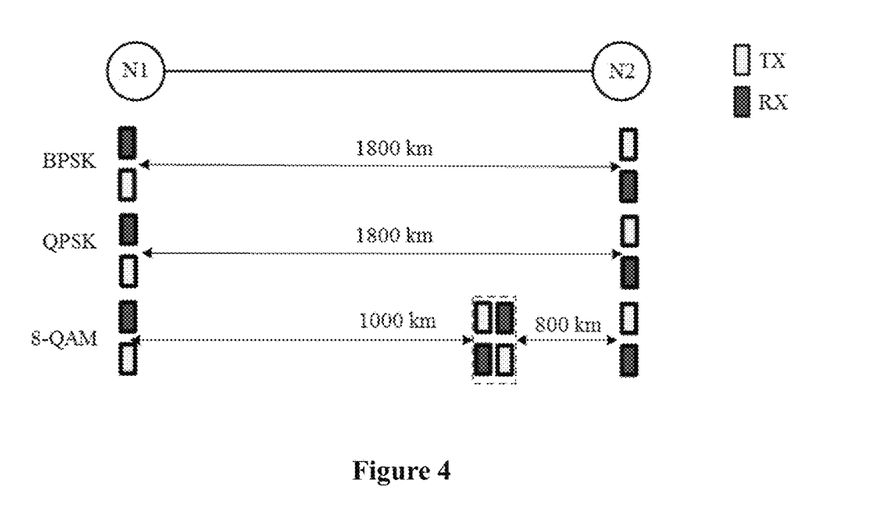
FIG. 4 is a schematic diagram showing a tradeoff between a modulation format and a transmission distance in a design method for a quasi-coarse wavelength division multiplexing optical network according to an embodiment of the present disclosure.

In FIG. 4, 800 Gb/s traffic demand is assumed to be served between nodes N1 and N2, and for the Quasi-CWDM optical network, it is assumed that the frequency spacing is 200 GHz and the guard band between two adjacent super-channels is 25 GHz. Based on the transmission distance information in Table 1, BPSK does not require any regenerators, but it has the lowest channel capacity (i.e., 175 Gb/s). In contrast, 8QAM has the highest channel capacity (i.e., 525 Gb/s), and needs the largest number of signal regenerators. Table 2 shows the required numbers of IP router ports, regenerators, and total costs in the different modulation formats. As can be seen, it is important to select the optimal modulation format to balance the costs against the spectrum usage.

Further, for the IP over Quasi-CWDM network, the modulation format for the optical channel is selected by using the MILP model, so as to design an IP over Quasi-CWDM network with the objectives of maximizing served traffic demand, and meanwhile minimizing the total hardware cost that is made up of IP router ports and signal regenerators.

Firstly, the inputs are given as follows:

(1) a physical topology of a network Gp=(N,E), where N is a set of network nodes and E is a set of network links;

(2) a traffic demand matrix $[T^{sd}]$ in units of Gb/s between a pair of nodes (s, d);

(3) a cost of a regenerator $C_R^f$ and a cost of an IP router port $C_{IP}^f$ in the $f^{th}$ modulation format, where $C_{IP}^f$ and $C_R^f$ are costs for one IP router port and one regenerator in the $f^{th}$ modulation format; and (4) a limited spectrum resource in each fiber link.

Secondly, based on the above inputs, it is developed a MILP model, with an objective of maximizing the following formula:

$$\Sigma_{j \in N, i \neq j} \lambda_{ij}^{sd} - \alpha(\Sigma_{i \in N, f \in F} C_{IP}^f \cdot N_{IP}^{i,f} + \Sigma_{f \in F, i,j \in N, i \neq j} C_R^f \cdot N_R^{ij,f}) \quad (1)$$

Specifically, the objective includes a first objective and a second objective. The first objective is to maximize total served traffic demand, and the second objective is to minimize the total cost of router ports and regenerators. More specifically, the two objectives are achieved by the following formulas (2)-(9):

$$\lambda^{sd} \leq T^{sd} \forall s, d \in N: s \neq d \quad (2)$$

$$\lambda_{ij}^{sd} = \lambda_{ji}^{ds} \forall s, d, i, j \in N: s \neq d, i \neq j \quad (3)$$

$$\sum_{j \in N} V_{ij}^f = N_{IP}^{i,f} \forall i \in N, f \in F \quad (4)$$

$$V_{ij}^f = \sum_{w \in W} \delta_w^{ij,f} \forall i, j \in N: i \neq j, \forall f \in F \quad (5)$$

$$N_R^{ij,f} = R_{ij}^f \cdot V_{ij}^f \forall i, j \in N: i \neq j, \forall f \in F \quad (6)$$

$$\sum_{j \in N: i \neq j} \lambda_{ij}^{sd} - \sum_{j \in N: i \neq j} \lambda_{ji}^{sd} = \begin{cases} \lambda^{sd} & i = s \\ -\lambda^{sd} & i = d \\ 0 & \text{otherwise} \end{cases} \forall s, d, i \in N: s \neq d \quad (7)$$

$$\sum_{s,d \in N: s \neq d} \lambda_{ji}^{sd} \leq \sum_{f \in F} C^f \cdot V_{ij}^f \forall i, j \in N: i \neq j \quad (8)$$

$$\sum_{f \in F, i,j \in N: i \neq j} \delta_w^{ij,f} \cdot \theta_{mn}^{ij} \leq 1 \forall w \in W, m \in N, n \in N_i \quad (9)$$

In the above formulas, indexes, sets, parameters, and variables are explained as follows.

S is an index of the IP traffic flow of a source node and D is an index of the IP traffic flow of a destination node, which are routed over a lightpath virtual topology. i and j are the indexes of the nodes in the lightpath virtual topology. A lightpath established between the two nodes connects a pair of router ports. $N_i$ is the set of adjacent nodes of a node i in physical topology. F is a set of modulation formats, which include BPSK, QPSK, and 8QAM. W is the set of wavelengths of each fiber link. $\lambda^{sd}$ is served traffic demand between each pair of nodes, which is in units of Gb/s. $R_{ij}^f$ is number of required regenerators along the fixed shortest route of lightpath virtual link (i, j) in the $f^{th}$ modulation format, assuming that each virtual link takes the shortest route as the lightpath virtual link.

$C^f$ is a rate of a Quasi-CWDM optical channel in the $f^{th}$ modulation format. $\theta_{mn}^{ij}$ is equals to 1 if physical link (m, n) is used by the lightpath virtual link (i, j); and otherwise, $\theta_{mn}^{ij}$ is equals to 0. $\alpha$ is a weight factor. $\lambda_{ij}^{sd}$ is a variable to indicate the traffic demand between a pair of nodes (S, D)

that traverses the virtual link (i, j). $V_{ij}^{f}$ is a variable to indicate the number of Quasi-CWDM optical channels in the $f^{th}$ modulation format on virtual link (i, j). $N_{IP}^{i,f}$ is the number of IP router ports in the $f^{th}$ modulation format at node i. $N_{R}^{ij,f}$ is the number of signal regenerators in the $f^{th}$ modulation format between virtual links. $\delta_{w}^{ij,f}$ is equal to 1 if an optical channel on virtual link (i, j) adopts the $f^{th}$ modulation format on wavelength w, and otherwise, $\delta_{w}^{ij,f}$ is equal to 0.

Figure 5:
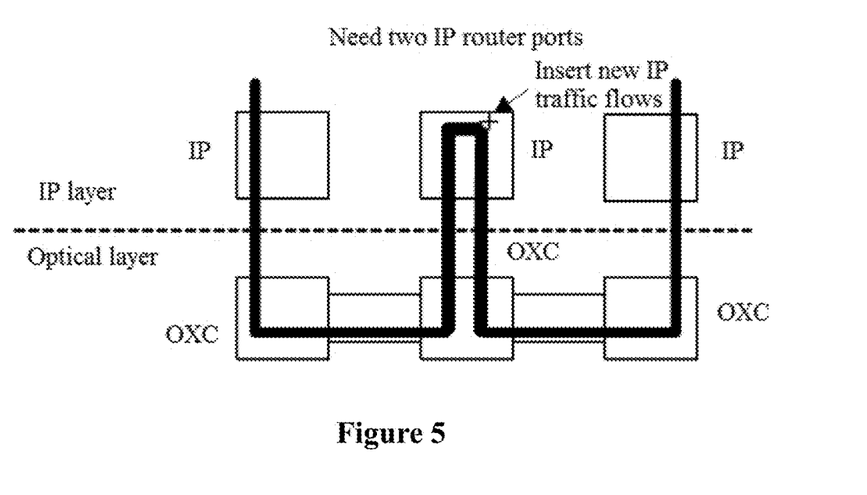
FIG. 5 is a schematic diagram showing signal regeneration in an IP layer in a design method for a quasi-coarse wavelength division multiplexing optical network according to an embodiment of the present disclosure.
Figure 6:
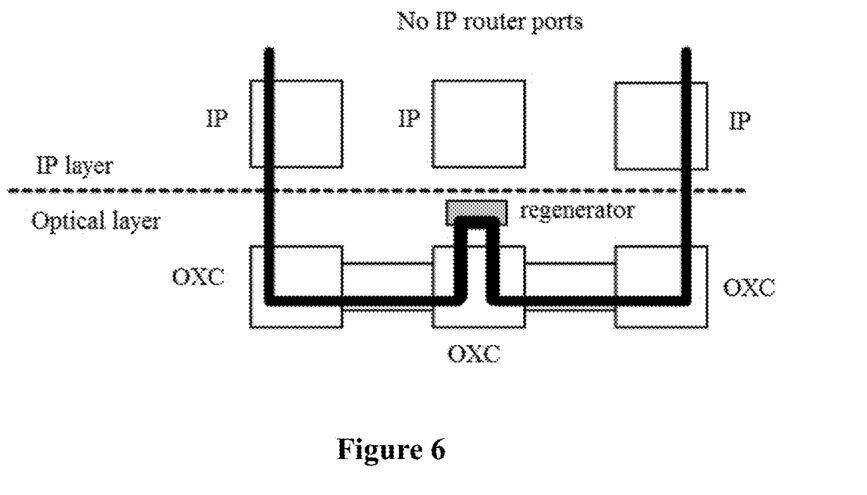
FIG. 6 is a schematic diagram showing signal regeneration in an optical layer in a design method for a quasi-coarse wavelength division multiplexing optical network according to an embodiment of the present disclosure.

Further, for the IP over Quasi-CWDM optical network, signal regeneration can be implemented either in the IP layer or in the optical layer. FIG. 5 shows signal regeneration in the IP layer, which is regenerated by interrupting signals of an optical channel by an intermediate router, so that more traffic demand can be loaded onto the regenerated optical channel. However, two additional expensive IP router ports are to be provided at an intermediate node, thereby increasing costs of devices. Another approach for signal regeneration is to regenerate the signal in the optical layer as shown in FIG. 6, and in this case, only a pair of Optical-Electrical-Optical converters is provided, which is generally cheaper than IP layer regeneration. However, the signal regeneration in the optical layer does not allow grooming additional traffic at the regeneration node even though the channel may be under-utilized, which leads to inefficient use of the spectrum. Thus, for an IP over Quasi-CWDM network, it is important to select signal regeneration for different optical channels so as to achieve an optimal network design. In view of the above-described analysis and the actual situation, those skilled in the art may select whether to implement the regeneration in the IP layer or in the optical layer, which is not defined in the present disclosure.

In the present disclosure, the performance of the Quasi-CWDM optical network obtained by the design method for the Quasi-CWDM optical network according to the above embodiment is evaluated as follows:

1. Spectrum Efficiency Evaluation Based on Dynamic Sub-Wavelength Traffic Grooming To evaluate capacity efficiency of the IP over Quasi-CWDM optical network, the Quasi-CWDM optical network is considered to be used to provision dynamic sub-wavelength traffic service. The arrival of IP traffic service requests with different bandwidth follows a Poisson distribution and the holding time of the IP traffic flow follows an exponential distribution. Bandwidth blocking probability for IP traffic flows is taken as a performance evaluation criterion, which is defined as a ratio of total blocked IP traffic bandwidth to the total bandwidth requested.

A conventional multiple-hop traffic grooming scheme is adopted to provision the IP service requests through the existing remaining capacity of optical channels. Only if the remaining capacity is not sufficient to accommodate an IP traffic flow, it should be sought to be establish a new direct lightpath between a pair of nodes, so as to provision the IP traffic service. For simplicity, enough idle spectrum resources are sought on the shortest route between the pair of nodes to establish the optical channel, and the most efficient modulation format is selected according to its physical distance. If there are no sufficient idle spectrum resources along the shortest path, the IP traffic demand request will be blocked. During the grooming process, the IP traffic flow can be split onto multiple connections via different routes. For IP traffic demand release, the IP traffic flows is removed by releasing the consumed network resources from the network. If the removal of the IP traffic flow makes the optical channel free of any IP traffic, the optical channel will also be released in the optical layer.

2. Performance Evaluation

Two test networks, i.e., (a) a 6-node, 9-link (n6s9) network and (b) a 14-node, 21-link NSFNET network, are taken into consideration. A 4000 GHz fiber spectrum is assumed in each fiber link, which corresponds to 80 50 GHz optical channels. A 25 GHz guard band is required between two adjacent optical channels. For three modulation formats, i.e., BPSK, QPSK, and 8QAM, the performances are evaluated. The corresponding IP router ports and signal regenerator costs are shown in Table 1.

(1) Static Traffic Demand

In this case, the IP traffic demand between each pair of nodes is randomly generated within a range of (400, 2000) Gb/s for the n6s9 network and (400, 1000) Gb/s for the NSFNET network. The MILP model is solved by using the commercial software AMPL/gurobi. Frequency spacing varies from 50 GHz (DWDM), to 100 GHz (DWDM), to 200 GHz (Quasi-CWDM), and to 400 GHz (Quasi-CWDM).

Figure 7:
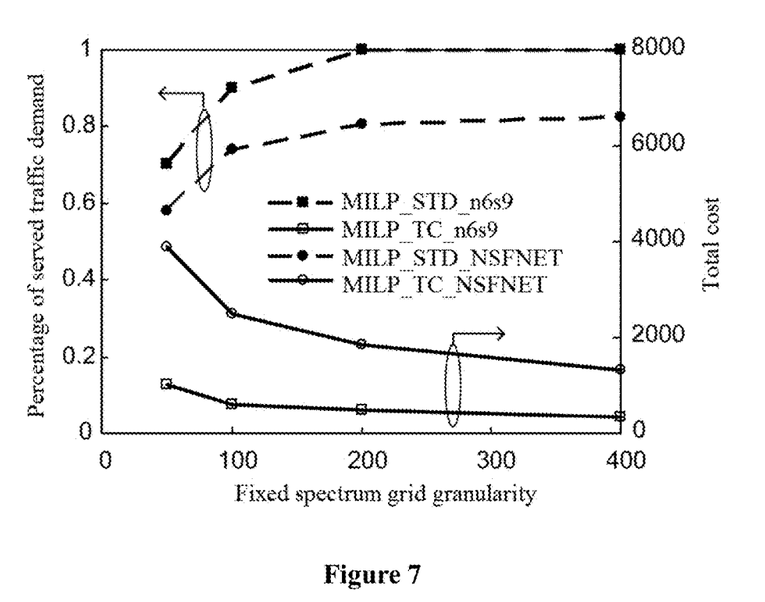
FIG. 7 is a schematic diagram showing results of an MILP model for different networks in terms of a traffic demand and a total network cost in a design method for a quasi-coarse wavelength division multiplexing optical network according to an embodiment of the present disclosure.

FIG. 7 shows results of an MILP model, in which STD indicates the total served traffic demand and TC indicates the total network cost. As can be seen, with the increase of the granularity of the frequency spacing, the completed served traffic demands increase. This is because larger frequency spacing requires fewer guard bands between channels given the limited total fiber spectrum resource. For example, with a 200 GHz frequency spacing, 20 guard bands are needed in a 4000 GHz fiber spectrum, while with a 100 GHz frequency spacing, 40 guard bands are needed. Thus, the Quasi-CWDM network is more spectrum efficient than the DWDM network. A cost reduction can be observed in FIG. 7, which means that larger frequency spacing is beneficial to reducing the network cost.

(2) Dynamic Traffic Demand

The performance of the IP over Quasi-CWDM network under dynamic IP traffic demand is also evaluated. The performance of the IP over Quasi-CWDM network is compared to that of the IP over EON network. For EON, each fiber link is assumed to have 320 Frequency Slots (FSs), with each FS having 12.5 GHz. The traffic load between each pair of nodes is assumed to be 5 Erlang. And for each arrived IP traffic flow, its bandwidth is assumed to be generated randomly within a range of (10, 100) Gb/s, and each channel is assumed to be assigned a bandwidth between a minimum number of Frequency Slots (FSs) per channel $FS_{min}$ and a maximal 16 FSs (which corresponds to 200 GHz). The purpose of setting a minimum number of FSs for each elastic optical channel is to avoid too much waste of guard bands because if a channel's effective bandwidth is too small, the relative waste of the guard band will be high. There are $10^5$ IP traffic flow arrival events in dynamic model simulation.

Figure 8:
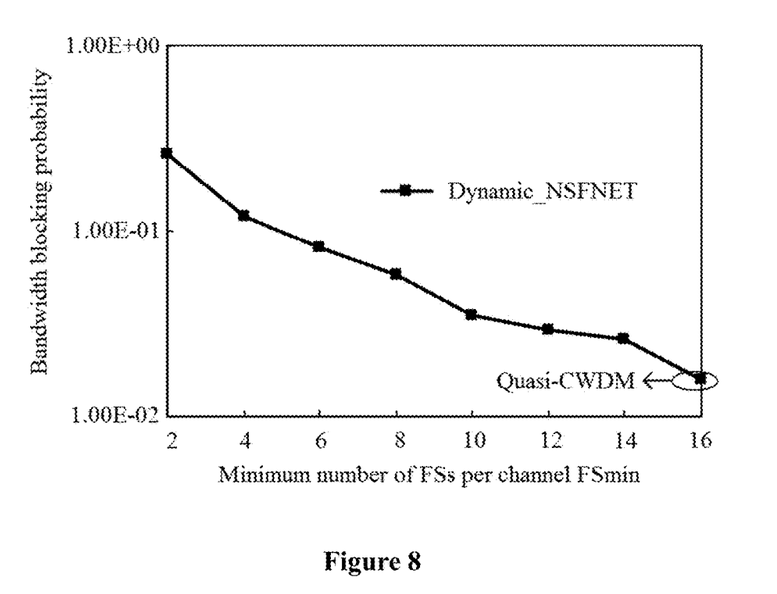
FIG. 8 is a diagram showing a relationship between a bandwidth blocking probability and the minimum number of Frequency Slots (FSs) per channel $FS_{min}$ in a design method for a quasi-coarse wavelength division multiplexing optical network according to an embodiment of the present disclosure.

FIG. 8 shows how bandwidth blocking probability changes with the increase of the value of $FS_{min}$. It should be noted that in a case that $FS_{min}$ is equal to 16, which means that the minimal and maximal numbers of the assigned FSs for the optical channel are equal, this just corresponds to the case of Quasi-CWDM, in which each channel is a 200 GHz super-channel. As can be seen, with an increasing $FS_{min}$, the IP traffic flow bandwidth blocking probability decreases and in the case that the network is configured as a Quasi-CWDM optical network (i.e., $FS_{min}$=16), the bandwidth blocking probability is the lowest, which implies improved capacity efficiency of the Quasi-CWDM network compared to the EON.

In view of the above, a new Quasi-CWDM network architecture with spectrum efficiency and cost saving is provided. Similar to the conventional DWDM network, the new network architecture does not require any expensive wavelength selective switch for flexible grid, but can support an optical super-channels using fixed quasi-coarse wavelength division multiplexing frequency spacing with granularity of which is at least 200 GHz. For each optical super-channel in the Quasi-CWDM network, different modulation formats can be adaptively selected based on rate requirements and channel physical conditions. A mixed integer linear optimization model is proposed to maximize the total IP served traffic demand. The Quasi-CWDM network architecture is evaluated from the point of costs, and the efficiency of spectrum utilization in Quasi-CWDM networks is also evaluated. Further, sub-wavelength traffic grooming in IP over Quasi-CWDM networks is also considered. In addition, the spectrum efficiency is calculated by dynamic simulation of the bandwidth blocking probability. The results show that the Quasi-CWDM network has improved spectrum efficiency and lowered hardware costs.

The design method for quasi-coarse wavelength division multiplexing optical network is described in detail hereinbefore. Specific cases are used herein to illustrate the principle of the present invention and its specific implementation. The above descriptions are only preferred embodiments of the present disclosure and are not to limit the present disclosure. It should be noted that for those skilled in the art, any changes, equivalents and modifications which are made within the spirit and principle of the present disclosure shall fall within the protection scope of the present disclosure.

The invention claimed is:

1. A design method for a quasi-coarse wavelength division multiplexing optical network, wherein the quasi-coarse wavelength division multiplexing optical network comprises one or more optical channels, a plurality of nodes, an optical layer with a plurality of regenerators and an IP layer with a plurality of IP router ports, the design method comprising:
   determining an actual rate requirement on the one or more optical channels and a physical condition of the one or more optical channels and the plurality of nodes;
   selecting, from a plurality of candidate modulation formats, modulation formats for the one or more optical channels, respectively, by using a mixed integer linear programming (MILP) model;
   determining first quantities of to-be-deployed regenerators for the one or more optical channels, respectively, by using the MILP model;
   determining second quantities of to-be-deployed IP router ports for the plurality of nodes, respectively, by using the MILP model;
   deploying the plurality of regenerators among the one or more optical channels, based on the respective first quantity for each of the one or more optical channels;
   deploying the plurality of IP router ports among the plurality of nodes, based on the respective second quantity for each of the plurality of nodes; and
   transmitting data over each of the one or more optical channels, by using the respective modulation format,
   wherein the actual rate requirement on the optical channel and the physical condition of the optical channel are taken as inputs of the MILP model, and the modulation formats, the first quantities, and the second quantities are outputted by the MILP model by taking maximizing a total served traffic demand of the quasi-coarse wavelength division multiplexing optical network as a first objective and minimizing the construction costs of the quasi-coarse wavelength division multiplexing optical network as a second objective; and
   wherein the construction costs are jointly determined by a cost of each of the plurality of regenerators, a cost of each of the plurality of IP router ports, a quantity of the plurality of regenerators, and a quantity of the plurality of IP router ports, and a spectrum spacing of the optical channel has a preset fixed bandwidth greater than or equal to 200 GHz.

2. The design method according to claim 1, wherein the optical channel is an optical super-channel.

3. The design method according to claim 2, wherein the preset fixed bandwidth is 200 GHz.

4. The design method according to claim 3, wherein the quasi-coarse wavelength division multiplexing optical network comprises at least two optical channels and a frequency spacing between adjacent ones of the at least two optical channels is 25 GHz.

5. The design method according to claim 4, wherein the plurality of candidate modulation formats for the optical channel comprises BPSK, QPSK or 8QAM.

* * * * *